(12) United States Patent
Downing

(10) Patent No.: US 10,926,823 B2
(45) Date of Patent: Feb. 23, 2021

(54) CYCLE SEAT

(71) Applicant: DARIUS DEVELOPMENT LIMITED, Chiddingfold (GB)

(72) Inventor: John Eugene Downing, Chiddingfold (GB)

(73) Assignee: DARIUS DEVELOPMENT LIMITED, Chiddingfold (GB)

( * ) Notice: Subject to any disclaimer, the term of this patent is extended or adjusted under 35 U.S.C. 154(b) by 0 days.

(21) Appl. No.: 16/087,535

(22) PCT Filed: Jun. 2, 2017

(86) PCT No.: PCT/GB2017/051592
§ 371 (c)(1),
(2) Date: Sep. 21, 2018

(87) PCT Pub. No.: WO2017/208015
PCT Pub. Date: Dec. 7, 2017

(65) Prior Publication Data
US 2019/0270491 A1    Sep. 5, 2019

(30) Foreign Application Priority Data
Jun. 2, 2016 (GB) ...................... 1609628

(51) Int. Cl.
*B62J 1/00* (2006.01)
*B62J 1/08* (2006.01)
*B62J 1/28* (2006.01)

(52) U.S. Cl.
CPC ............... *B62J 1/007* (2013.01); *B62J 1/08* (2013.01); *B62J 1/28* (2013.01)

(58) Field of Classification Search
None
See application file for complete search history.

(56) References Cited

U.S. PATENT DOCUMENTS

| 592,783 | A | 11/1897 | Hess |
| D615,077 | S | 11/1898 | Lovekin |
| 1,462,976 | A | 7/1923 | Mesinger |
| 2,568,796 | A | 9/1951 | Dunlap |
| 2,613,722 | A | 10/1953 | Ruppert |

(Continued)

FOREIGN PATENT DOCUMENTS

| AU | PN350595 | 1/1997 |
| CA | 2095055 | 10/1994 |

(Continued)

OTHER PUBLICATIONS

European Application No. 17 728 622.6 Communication under rule 71(3) EPC dated Nov. 2, 2020.

*Primary Examiner* — David R Dunn
*Assistant Examiner* — Christopher E Veraa
(74) *Attorney, Agent, or Firm* — Jason P. Mueller; FisherBroyles, LLP (57) ABSTRACT

A cycle seat cycle seat comprising: a crotch area (2), arrangement in use between a user's legs; a central seat section (3), which seat section is arranged for supporting the user's backside; and a rear support portion (5); wherein said portion extends away from the seat section to control rearwards movement of the user with relation to the seat section. The cycle seat may include a displaceable and/or resiliently deformable portion.

17 Claims, 7 Drawing Sheets

(56) References Cited

U.S. PATENT DOCUMENTS

| | | | | |
|---|---|---|---|---|
| 3,844,611 | A | 10/1974 | Young | |
| 3,879,087 | A | 4/1975 | Russo | |
| 3,970,345 | A | 7/1976 | Holcomb | |
| 4,141,587 | A | 2/1979 | Holcomb | |
| 4,363,516 | A | 12/1982 | Braly | |
| 4,475,770 | A | 10/1984 | Persons, II | |
| 4,502,727 | A | 3/1985 | Holcomb et al. | |
| 4,909,522 | A | 3/1990 | Flanigan | |
| 5,011,222 | A * | 4/1991 | Yates | B62J 1/007 297/214 |
| 5,076,642 | A | 12/1991 | Beylet et al. | |
| 5,201,538 | A | 4/1993 | Mayn | |
| 5,823,618 | A | 10/1998 | Fox et al. | |
| 5,853,062 | A | 12/1998 | Hulett | |
| 5,863,094 | A | 1/1999 | Endo | |
| 5,887,943 | A | 3/1999 | Lee | |
| 5,921,624 | A | 7/1999 | Wu | |
| 6,189,908 | B1 | 2/2001 | Lu | |
| 6,206,399 | B1 | 3/2001 | Schnitzenbaumer | |
| 6,761,401 | B1 * | 7/2004 | McGlynn | B62J 1/12 297/195.12 |
| D494,893 | S | 8/2004 | Shiau | |
| D625,932 | S | 10/2010 | Jessie, Jr. | |
| 7,866,431 | B2 * | 1/2011 | Ito | B62J 1/28 180/219 |
| 8,011,725 | B2 | 9/2011 | Andrews | |
| 2004/0239072 | A1 | 12/2004 | Chou | |
| 2005/0046246 | A1 | 3/2005 | Shiau | |
| 2005/0046247 | A1 | 3/2005 | Saccucci | |
| 2006/0237946 | A1 | 10/2006 | Hutson | |
| 2009/0236822 | A1 | 9/2009 | Andrews | |
| 2011/0049946 | A1* | 3/2011 | Kaita | B62J 1/28 297/215.12 |
| 2013/0175783 | A1 | 7/2013 | Yuan | |
| 2015/0035326 | A1 | 2/2015 | Wong et al. | |
| 2015/0232141 | A1 | 8/2015 | Bettin | |
| 2017/0088208 | A1* | 3/2017 | Ogawa | B62J 1/28 |
| 2018/0304948 | A1* | 10/2018 | Hsu | B62J 1/005 |

FOREIGN PATENT DOCUMENTS

| | | | |
|---|---|---|---|
| CA | 2167105 | | 7/1996 |
| CA | 2289246 | | 3/2000 |
| CA | 2322912 | | 4/2001 |
| CN | 2223239 | | 3/1996 |
| CN | 2248157 | | 2/1997 |
| CN | 2500586 | | 7/2002 |
| CN | 2521121 | | 11/2002 |
| CN | 201046737 | | 4/2008 |
| CN | 201056245 | | 5/2008 |
| CN | 201321105 | | 10/2009 |
| CN | 102019979 | | 4/2011 |
| CN | 102476673 | | 5/2012 |
| CN | 202389509 | | 8/2012 |
| CN | 203005640 | | 6/2013 |
| CN | 103402859 | A | 11/2013 |
| CN | 203268203 | | 11/2013 |
| CN | 104097714 | | 10/2014 |
| CN | 203958403 | | 11/2014 |
| CN | 204606047 | | 9/2015 |
| DE | 3728194 | | 3/1989 |
| DE | 9317949 | | 2/1994 |
| DE | 9319246 | | 3/1994 |
| DE | 29710985 | | 9/1997 |
| DE | 202006009040 | | 9/2006 |
| DE | 102011018152 | | 10/2012 |
| EP | 2086559 | | 10/1988 |
| EP | 1837271 | | 9/2007 |
| EP | 1982907 | A1 | 10/2008 |
| ES | 2235566 | | 7/2005 |
| IT | VI20030020 | | 8/2004 |
| WO | 9101244 | | 2/1991 |
| WO | 92/11175 | | 7/1992 |
| WO | 9211175 | | 7/1992 |
| WO | 9427858 | | 12/1994 |
| WO | 200000379 | | 1/2000 |
| WO | 2011058430 | | 5/2011 |
| WO | 2015/017473 | | 2/2015 |

* cited by examiner fig.1 fig. 2 fig. 3a fig. 3b fig.4 fig. 7a fig. 7b fig. 7c

CYCLE SEAT

This application is a national stage entry under 35 U.S.C. 371 of PCT Patent Application No. PCT/GB2017/051592, filed Jun. 2, 2017, which claims priority to GB Patent Application No. 1609628.1, filed Jun. 2, 2016, the entire contents of each of which are incorporated herein by reference.

FIELD OF THE INVENTION

The present invention relates to a cycle seat.

BACKGROUND

Increasing numbers of users or cyclists are taking to the highways in an attempt to get fit, save money or avoid stress.

Many users of cycles, in particular purely pedal-driven cycles, may find it difficult to scale hills or otherwise pedal the cycle at some times.

In particular when seated pedalling can be a strain on the user's back, and upper body and arms, wherein the user must pull against the thrust generated by the pedalling leg action.

PRIOR ART

Accordingly a number of patent applications have been filed in an attempt to resolve the problem or similar, including the following:

Chinese utility model CN 201 321 105 (RENFA) discloses a bicycle saddle with a shock-absorption backrest, which comprises a saddle pipe, two seat beams and a saddle seat cushion.

Granted U.S. Pat. No. 8,011,725 (ANDREWS) discloses a bicycle rider seat brace for maintaining the buttocks of a bicycle rider in a stationary position on a racing bicycle seat during seated pedalling.

U.S. Pat. No. 4,363,516 (BRALY et al) discloses a thrust support for attachment to a conventional cycle seat comprising: a U-shaped member having a pair of spaced legs interconnected at one end by a bight.

SUMMARY OF THE INVENTION

According to the invention, there is provided a cycle seat defined by claim 1.

The proximal portion of the rear support portion generally conforms with the support surface such that the contours of the support surface generally match those of the rear support portion. There may however be a groove or slight discontinuity where the rear support portion meets the seat section, but this would not be significant enough to cause discomfort to a user sat on the cycle seat.

According to the present invention there is provided a cycle seat device comprising: a crotch area which is arranged between a user's legs in use; a seat section which is arranged to support the user's backside in use; and at least one rear support portion which extends away from the upper surface of the seat section (e.g., substantially vertically) and restricts rearwards movement of the user with respect to the seat section.

The cycle seat may be a unitary body that includes the seat section and the rear support portion or these may be separate parts that are then fixed together.

The cycle seat advantageously can prevent a cyclist from sliding backwards from preferred positions on the cycling seat and reduces strain on the user by providing a counterforce against their backside (specifically, the coccyx) which helps the cyclist maintain their position and posture.

During conventional cycling, a cyclist exerts greatest force on the pedals when pushing them downwards and forwards from the uppermost point of their circular revolution. This pedalling motion exerts a rearward force on the user, acting to push them back in their seat. When the user presses backwards against the rear support portion, the support portion provides a counterforce to hold the user in a suitable and stable position on the cycle seat.

The rear support portion may extend in line with the coccyx of a person sitting on the cycle seat. Therefore the rear support portion may extend in line with the coccyx in use.

In this way the pedal thrusts of the user are countered by resistance from the rear support portion, wherein the user is pushed into the support portion during thrusting.

The crotch area may extend substantially horizontally from the front of the seat section such that the crotch area and seat section adopt a conventional bicycle seat shape.

The rear support portion may extend away (e.g., substantially vertically) from the rear of the seat section. Therefore, when a user sits on the seat with their backside on the seat section and the crotch area between their legs, the rear support portion extends upwards behind their backside and supports the user. It is advantageous that the seat engages the coccyx and preferably does not interfere with the user's glutes (gluteal muscles), which could cause discomfort and/or inhibit good cycling technique.

The cycle seat may be a seat for a bicycle, a unicycle, a tricycle or a quadracycle.

Preferably the cycle seat is a bicycle seat.

In some embodiments the rear support portion is displaceable. The rear support portion may be displaceable in part, or the rear support portion may be displaceable in its entirety. For example, the support portion may be able to flex such that in use the uppermost end of the support portion is displaced backwards under pressure, but the point at which the support portion is connected to the seat section remains rigidly located. In some further embodiments the rear support portion is arranged to move in response to pressure from the coccyx. For example, when a user slides or leans back in the cycle seat such that part of the user's body, such as their buttocks or their coccyx region exerts a force on the rear support portion, the support portion may be displaced backwards.

The support portion may be displaced directly away from the coccyx, may slide along some fixed path, or may pivot about some fixed point. The distance or range of angles through which the support portion is displaceable may be limited, such that after pressure from the coccyx has displaced the support portion some initial distance, the pressure will displace the support portion no further. In some further embodiments, when the pressure from the coccyx is removed, the support portion may elastically return to its position before the pressure was applied.

The support portion may resist displacement, such that the force exerted on the support portion must exceed some magnitude in order to displace the support portion. The resistance of the support portion to displacement may increase as the support portion is displaced further from its rest position. In such an embodiment, backwards forces that act on the user are countered by resistance to the displacement of the rear support portion.

The displacement of the rear support portion may be controlled by a dashpot which acts to reduce the transmission of shocks or vibrations from a cycle to the user's coccyx.

The support portion may be resiliently displaceable such that when the pressure against the user's body and in particular the coccyx is removed, the support portion returns to its original position or arrangement.

The resilient displacement of the rear support portion may be cushioned, for example, by springs or by resiliently deformable bushings.

Alternatively, or additionally, the rear support portion may be manually displaceable by a user so as to vary the shape of the cycle seat. For example, the height of the rear support may be variable such that it conforms to the coccyges of users of different heights, such a support portion may also be displaceable horizontally in response to pressure from the coccyges. In some embodiments the rear support portion may therefore be displaceable in relation to the seat section, at least in part.

The entirety of the rear support portion may be displaceable with respect to the seat section, or only some part of the support portion may be displaceable with respect to the seat section. In some embodiments as some initial low pressure is applied to the support section by a user's body, a part of the support portion may be displaced, and if the pressure exceeds some threshold level the other parts, or the entirety of the support portion may be displaced.

In some embodiments the rear support portion may comprise a resiliently deformable part. In some embodiments said resiliently deformable part may be anchored to the section at an anchor.

A resiliently deformable part may deform under pressure from the user's body and may return to its original form or arrangement when the pressure is removed.

A resiliently displaceable or resiliently deformable support portion may act to provide cushioning to a user's body, thereby reducing the impact from shocks or vibration A resiliently deformable support portion thereby allows the user greater comfort in using the portion and device. The deformation may be after the anchor, and/or at the anchor. The resilient deformable support portion may comprise padding.

In some embodiments the support portion is substantially formed of a resiliently deformable material. Therefore, when a user's body is in contact with and applies pressure to the support portion, the support portion will flex backwards, thereby allowing the user to move backwards on the seat some distance. In some embodiments the support portion is resiliently deformable.

In some embodiments the device comprises a resiliently deformable layer, for example a padding layer. Such padding may be included in the seat section and/or the rear support portion.

In some embodiments the device may be shaped with reference to body parts of the user. For example, in some embodiments the crotch area comprises sloped or inclined sides falling away from a central high point, which extends longitudinally and narrowly. The seat section may extend rearwards, flaring out to provide two opposing saddle sections, inclined downwards so as to allow for the user's buttocks to move comfortably while pedalling.

The rear support portion may comprise an arcuate or upwardly curved form, so as to mirror and conform to the shape of the user's lower back (specifically, the coccyx).

In some embodiments the rear support portion at rest may extend above the seat section, such that when the user sits on the seat, the support portion is displaced backwards from its rest position. This ensures that a resiliently displaceable support portion always provides supporting pressure to the user's body in use.

In some embodiments the anchor comprises the seat section. In some embodiments the rear support portion may be directly secured to the seat section or may be integral with the seat section. In this way the support portion may comprise an extending substantially unsupported part of the seat section. The seat section and the support portion may be formed from a single body.

In some embodiments the rear support portion may comprise an extension of the seat section, whereas in others the support portion and the seat section may be discrete parts of the cycle seat.

In some embodiments the rear support portion may be connected to the seat section by a hinge.

The rear support portion may be a separate body which is bonded to the seat section at an anchor. Such an anchor may comprise overlapping surfaces of the seat section and the rear support portion where a binding material is located. Alternatively, the support portion may be bonded to the crotch area at an anchor.

The anchor may extend along only a part of the support portion so as to leave part of the support portion unsupported. This may allow the unsupported part of the support portion to deform or flex so as to allow a user's coccyx to move.

In some embodiments the rear support portion comprises a body with wings extending from a portion of the circumference of body, wherein the wings are bonded to an area of the seat section. This may leave a part of the support portion relatively unsupported, this part may be the part of the support portion which extends substantially vertically and may be a part which is displaceable when under pressure by a part of the user's body that contacts the support portion. In these embodiments the support portion may be formed of a resiliently deformable material such that the unsupported portion is able to flex.

In some embodiments the displacement of the rear support portion may be sprung-biased. In some embodiments said bias may be provided by one or more springs.

Said spring may act at a hinge which connects the support portion to the seat section.

In some embodiments the portion may be arranged to move in vertical and horizontal directions while in use.

In some embodiments at least part of the rear support portion is displaceable into an opening in the seat section.

In some embodiments the cycle seat is arranged to travel in a horizontal direction in installation on a seat post, for example using a standard form of bicycle seat attachment means, wherein the device is clamped to the post on horizontal attachment bars or members according to user preference.

In some embodiments the attachment means may be horizontally displaceable in use. For example the seat may comprise a seat post with a spring biased suspension mechanism.

In some embodiments the rear support portion is arranged to surround or be adjacent the user's coccyx in use. For example, the portion may comprise a bipartite or bifurcated part, located to either side of the coccyx in use, adjacent or at the rearmost edge of the device in use. In this way the coccyx may advantageously be left free, and the user's surrounding body supported instead. Advantageously this relieves pressure on the coccyx whilst allowing the user's leg pedal thrusts to be countered.

In some embodiments the support portion is arranged to mirror the user's coccyx in use. For example, the portion may comprise an upstanding centrally located part of the device, which may be at or adjacent the centre of the width of the device's rearmost edge. Advantageously this enables the user's backside to be directly supported and prevents the user from moving rearwards undesirably.

In some embodiments the seat section may comprise a spring means, so as to allow the device to further provide comfort to the use. In some embodiments the spring means may be deformable in a vertical orientation. In some embodiments the spring means may be deformable in a horizontal direction. In such manner the section may be enabled to displace in more than one direction so as to further mitigate the impacts from the user's pedal thrusts during use.

The cycle seat may comprise an attachment means for attachment to a bicycle. In some embodiments said attachment means may comprise means for attaching the cycle seat onto or over an existing bicycle saddle. Preferably, the attachment means is arranged for attachment to a seat post, which may be inserted into the seat tube of a bicycle.

According to a second aspect of the invention there is provided a bicycle comprising a cycle seat as described above.

BRIEF DESCRIPTION OF FIGURES

FIG. 6 show isometric exploded views of the embodiment shown in FIG. 1 with FIG. 6c showing a rear support portion.

DETAILED DESCRIPTION OF FIGURES

With reference to FIGS. 1 to 7 there is shown a first embodiment of the cycle seat comprising: A crotch area, formed by a tapering elongated area extending forward from a wider seat section to a front end 2. The seat section comprises two opposing saddle sections 4, said sections stepping out from the crotch area at progressively widening hips 3. The crotch area forms a forward extension of the seat, i.e., the part that faces forward when the bicycle is in use. The two opposing saddle sections 4 form a rearward platform of the seat, i.e., the part that supports the user's backside when the bicycle is in use.

The rear support portion 20 is formed of the same material as the device, wherein the form of the portion is an elongated ovaloid curvature, consequently enabling flexure axially, but not necessarily laterally.

The forward end 7 of the support portion 20 may be arranged in an opening between the two opposing saddle sections 4, behind the crotch area. The forward end 7 of the support portion 20 is supported by the seat section, and lies substantially in the same plane as the seat section and the crotch area. The rear end 1 of the support portion 20 curves upwards and is unsupported. In use the rear end 1 contacts and supports a user's coccyx.

The portion extends in a vertical curve from an unsupported rear end 1 to a supported front end 7.

The portion comprises wings 9, extending from the perimeter or side edges of the front end 7, such that they contact the opposing saddle sections 4.

The device comprises an upper, saddle pad, seat saddle, of polyethylene, polymer, acrylonitrile butadiene styrene (abs) or other appropriate thermoplastics or graphene or other materials substantially rigid in sufficient weight.

The device comprises moulded mountings for two metallic or alloy frame members 6, which members support the upper body of the cycle seat from below.

The members comprise a known attachment means, wherein a clamp is used to attach the members to a seat post at a convenient point along the members.

In some embodiments the attachment means comprises a clamp which comprises means for travel in horizontal direction, wherein the attachment means may allow for displacement in use backwards on the horizontal part of the members, and/or a spring bias acting to push or slide the device with reference to the seat post. In this way the thrust of pedalling may be further accommodated.

In some further embodiments the members may comprise an attachment means for other saddles, allowing the device to clip thereover.

The mountings comprise two rear mountings 11 at or adjacent the rear of the underside of the saddle sections 4, and a front mounting 8 at or adjacent the crotch area end, which front mounting is arranged to accept two members.

The crotch area comprises a downwardly depending end, and downwardly inclined sides, wherein the user's crotch, thighs and legs are not impeded in use, during pedal thrusts.

The saddle sections depend downwards from a high point adjacent the hips, and form a curvature echoing the user's buttocks to rear.

The section is divided centrally by an opening 10 that narrows towards the distal end, and extends to a foremost point at or adjacent the hips.

The opening comprises a chamfered perimetric edge 5, inclining towards the rear support portion 20, wherein the portion is held in the opening by adhesion or bonding between the wings 9 and the opening edge 5.

The wings 9 extend and are bonded to approximately half of the opening edge 5, such that the rear end 1 is effectively unsupported, so as to allow vertical displacement of the rear end 1, wherein flexure in the material enables horizontal displacement.

In some embodiments the device may be incorporated in a bicycle.

Figure 1:
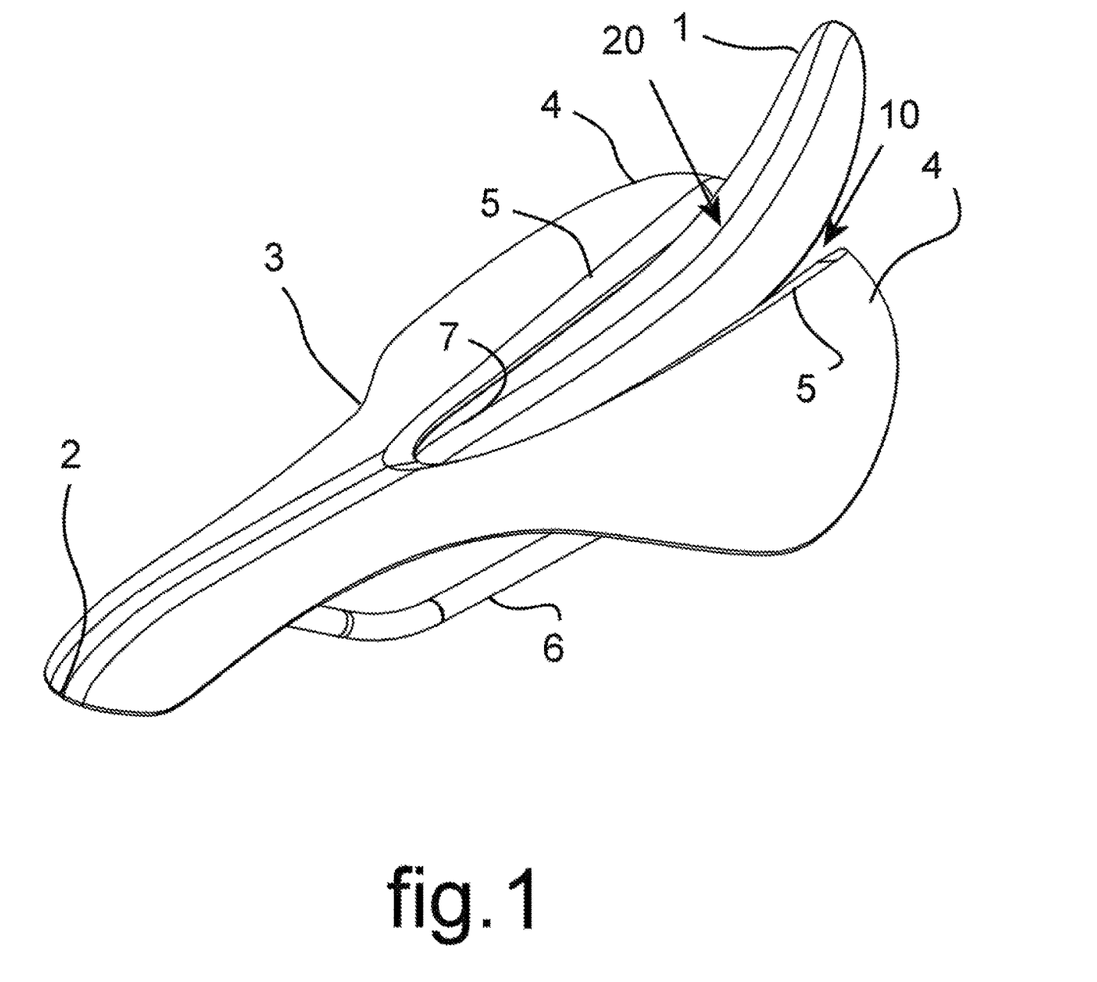
FIG. 1 shows an isometric view of a first embodiment of the device according to the present invention.
Figure 2:
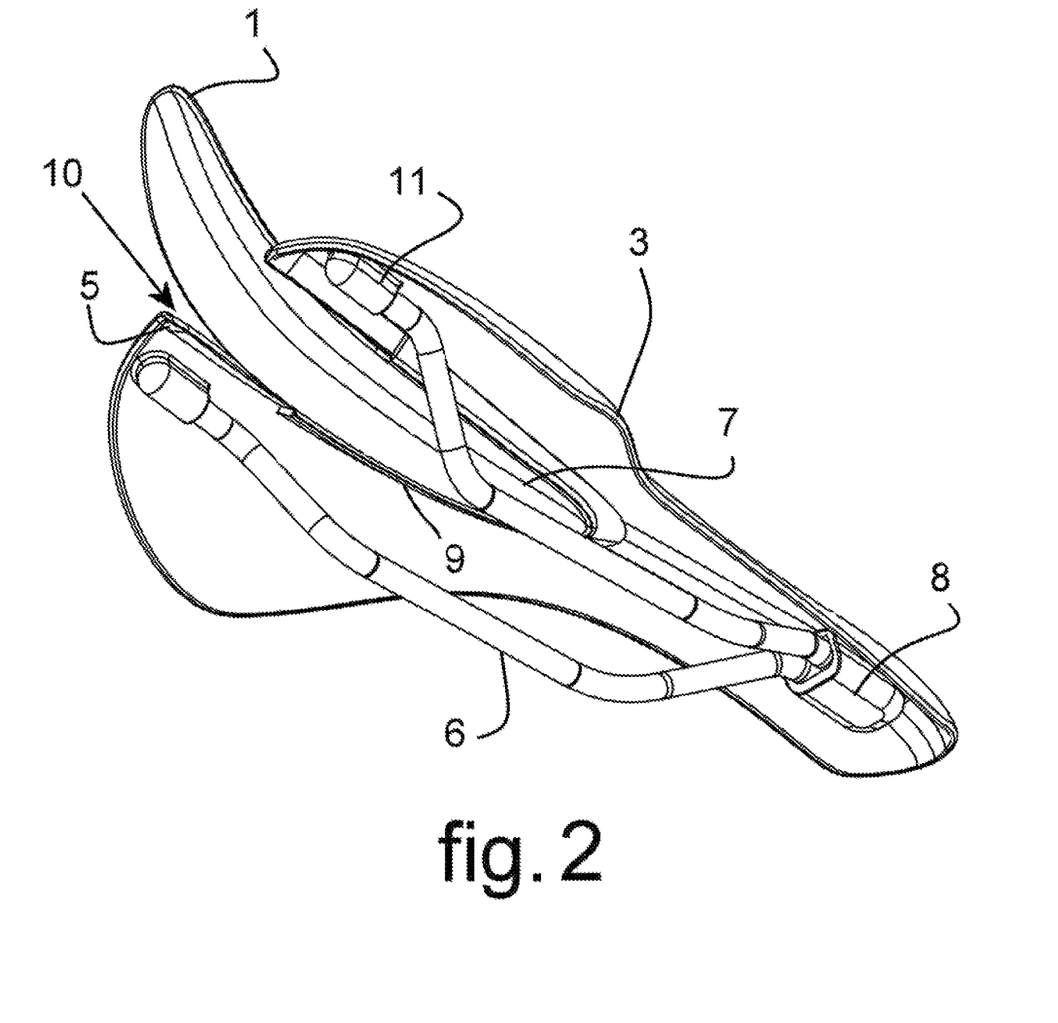
FIG. 2 shows a reverse isometric view of the embodiment shown in FIG. 1.
Figures 3A, 3B:
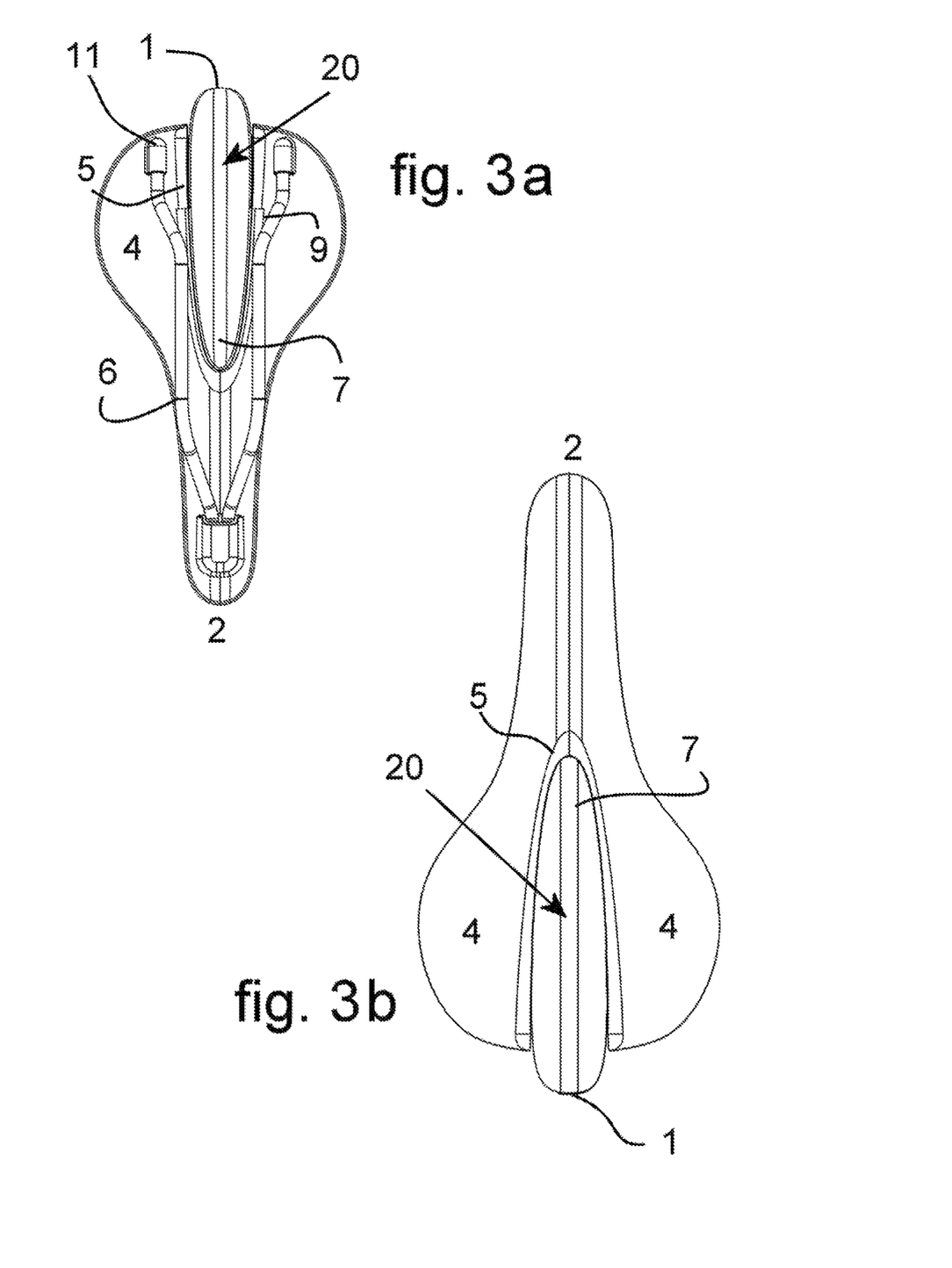
FIG. 3 show plan views of the embodiment shown in FIG. 1, from below and above respectively.
Figure 4:
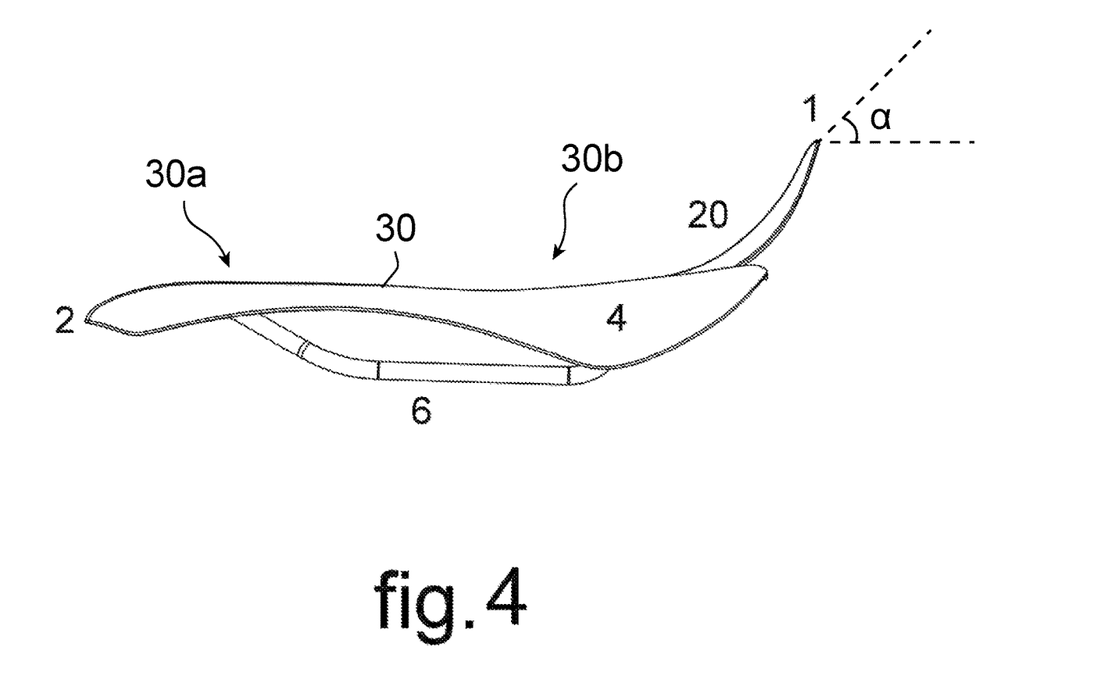
FIG. 4 shows a side view of the embodiment shown in FIG. 1.

FIG. 4 illustrates the features of the preferred embodiment of the cycle seat. Here, it can be seen that the seat section 2, 3, 4 defines a support surface 30.

The support surface 30 defines a forward extension 30a (this may corresponding to the crotch area). In use, a user will straddle the forward extension 30a. The forward extension 30a defines the forward direction of the seat in that it points in the direction of travel of the bicycle when the bicycle is in use.

The support surface 30 also defines a rearward platform 30b for supporting a user's backside (this may correspond to the two saddle sections 4 rearwardly of hips 3).

From the view of FIG. 4, it can be seen that in a side view (perpendicular to the forward and vertical directions) the uppermost extent of the support surface 30 extends in a substantially continuous line (which is preferably only very gently ergonomically curved) from the forward extension 30a into the rearward platform 30b.

The rear support portion generally defines an extension of the support surface 30. In this way, the rear support portion 20 curves gently upwardly from where it tangentially intersects the support surface 30. Put another way, the rear support portion 20 merges with the support surface 30 to provide a gradual transition to a rearmost support formed by the distal portion 20a.

That is, in the side view of FIG. 4, the rear support portion 20 meets the support surface generally along the tangent of that substantially continuous line and curves away from the uppermost extent of the rearward platform 30b. The proximal portion 20c of the rear support portion 20 engages with the seat section. Preferably, the wings 9 described above extend laterally from the proximal portion 20c for engagement with the seat section 2, 3, 4.

The distal portion 20a of the rear support portion 20 extends away from the rearward platform 30b and is inclined relative to the support surface 30, so as to be suitable for engaging the coccyx of a user and thereby restrict rearward motion of a user when sat on the support surface 30.

Figures 6A, 6B, 6C:
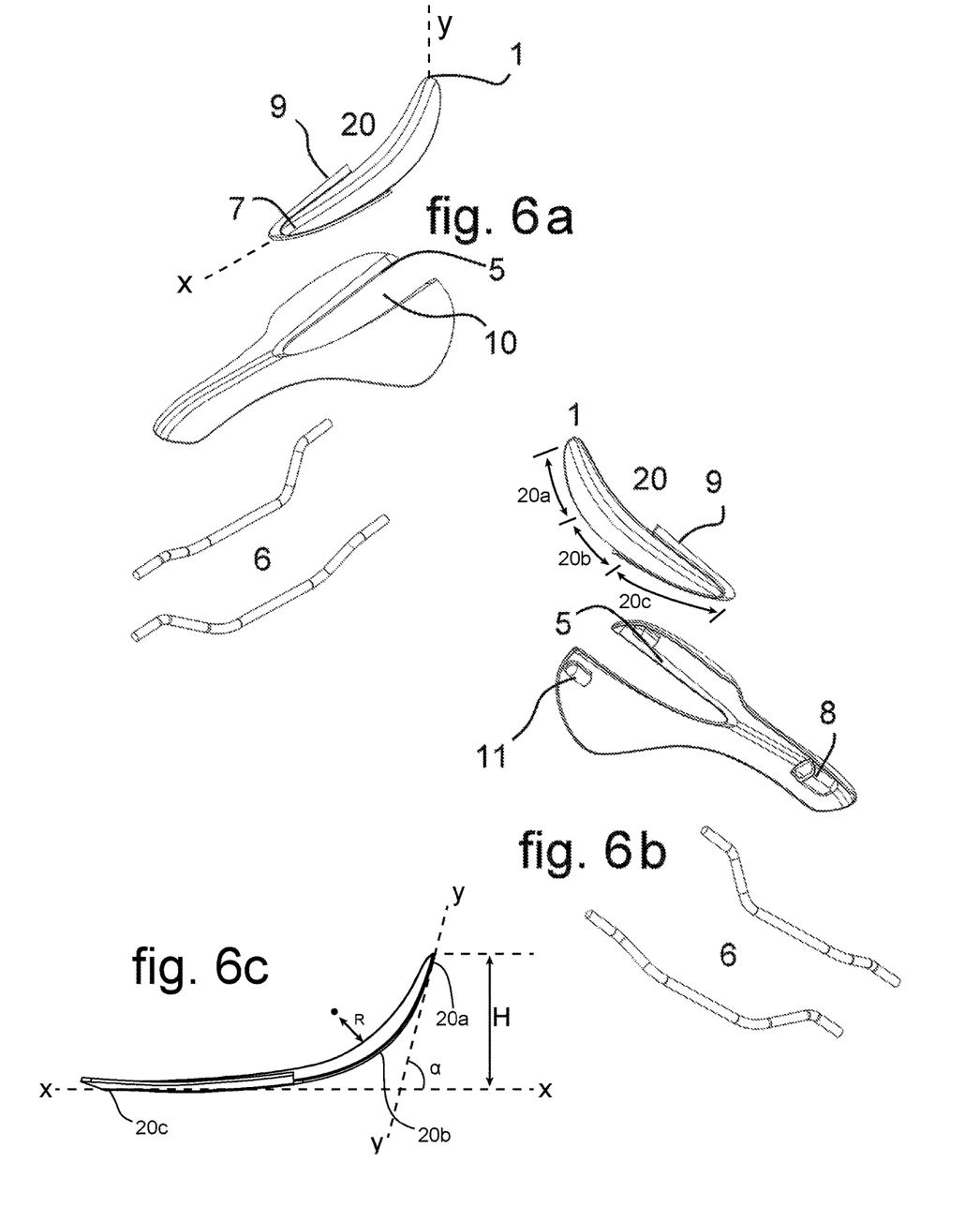
Figure 7A:
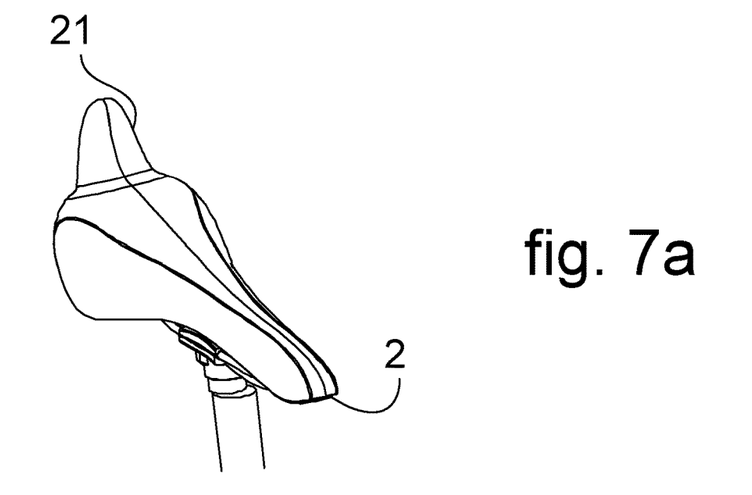
FIG. 7 show three variant embodiments of the device according to the present invention.
Figure 7B:
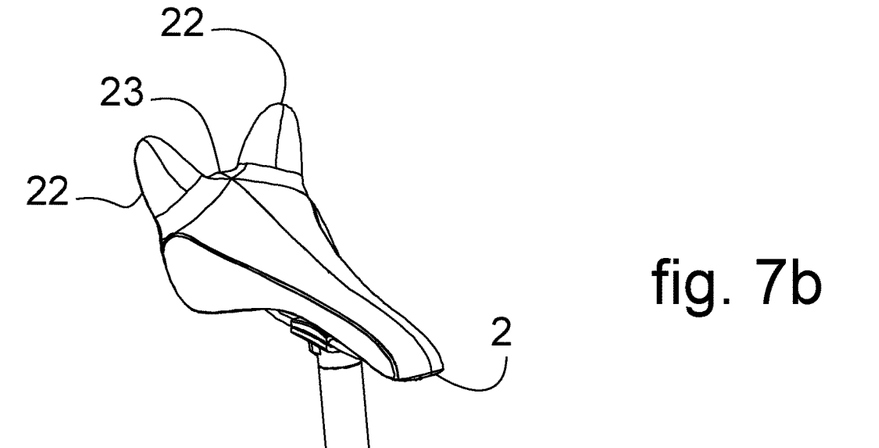
Figure 7C:
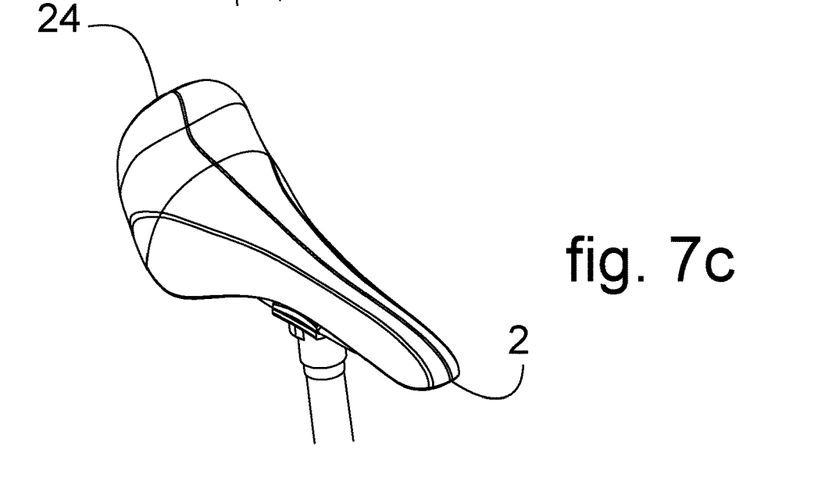

As can be seen from FIG. 6c, the end of the distal portion 20a terminates at an angle to the end of the proximal portion 20c. Preferably, this angle α is in the range 90 degrees to 120 degrees and more preferably 100 degrees to 110 degrees. When, as shown in FIG. 4, the seat is arranged generally horizontally, the angle α will denote the angle with the horizontal direction.

A midsection 20b of the rear support portion 20 joins the distal portion 20c to the proximal portion 20a. The midsection 20b forms the region of the rear support portion 20 having the greatest curvature (in the side view shown in FIG. 4). However, preferably the curve is still gentle and so the radius of curvature in the midsection preferably is not less than 10 mm, and more preferably is not less than 15 mm, along its length (this radius is measured in the plane defined by the tangents to each of the distal (X) and proximal (Y) ends as shown in FIG. 6c). The distal and/or proximal portions 20a, 20c may be straight or, more preferably, curved.

The geodesic length over the surface of the rear support portion 20 is preferably in the range 100 mm to 170 mm.

The distal end (i.e., the tip of the distal portion 20a) is offset in a direction perpendicular to a tangent X (shown in FIG. 6c) to the proximal end (i.e., the tip of the proximal portion 20c) by a distance H of at least 60 mm and preferably between 120 mm and 150 mm.

Figure 5A:
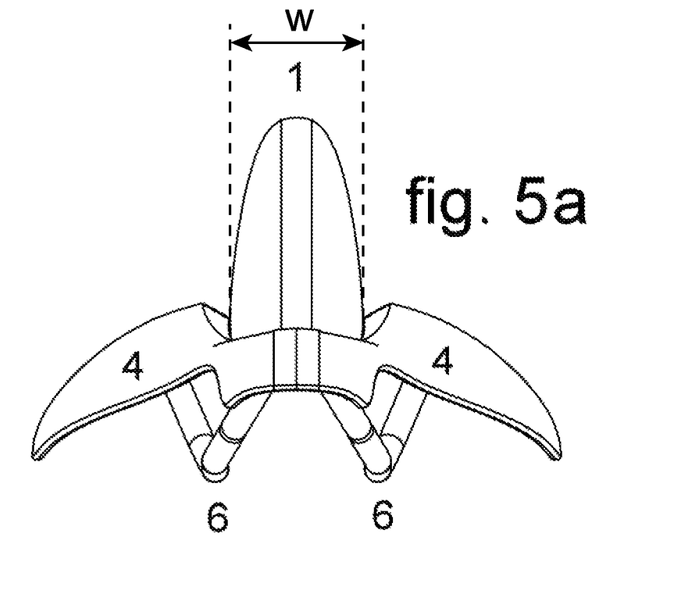
FIG. 5 show end views of the embodiment shown in FIG. 1.
Figure 5B:
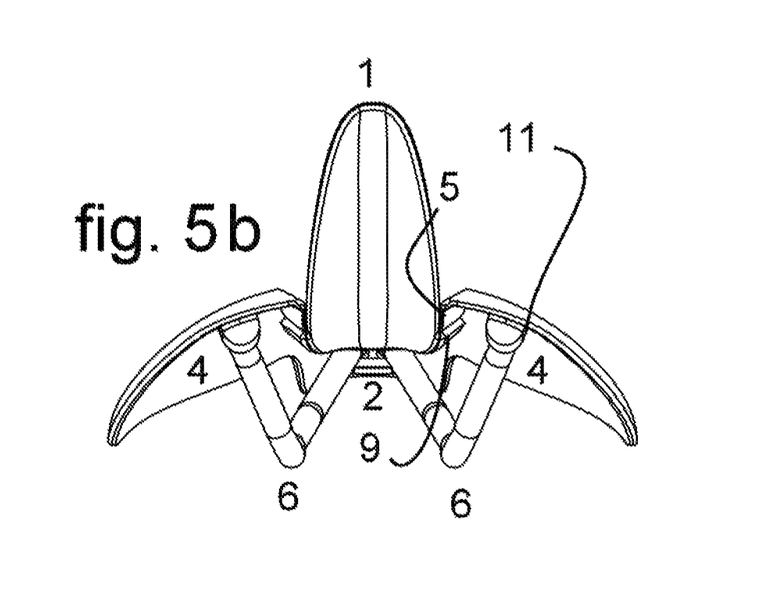

From the view of FIG. 5a, it can be seen that the support surface 30 is curved laterally downwardly from a generally straight ridge extending over the majority of its length, with a central region defining the substantially continuous line seen in FIG. 4. As can be seen from FIG. 5a, the rear support portion 20 is narrower than the rearward platform 30b. Preferably, the width W of the rear support portion 20 is no more than 40 mm (by width is meant the maximum width along the length of the elongate rear support portion 20). This width has been selected so that the rear support portion 20 will engage the user's coccyx and avoid (or substantially avoid) engagement with the user's glutes. Preferably, the width W is at least 10 mm.

Since the midsection 20b provides a gentle curve between the distal and proximal portions 20a, 20c, this can provide a much more comfortable surface for engagement with a user's coccyx than would be achieved by a sharper transition. Thus, the rear support portion 20 can restrict rearward motion of a user when sat on the support surface in a most comfortable way.

The invention has been described by way of examples only and it will be appreciated that variation may be made to the above-mentioned embodiments without departing from the scope of invention as defined by the claims, in particular but not solely combination of features of described embodiments.

Embodiments are considered as set out in the following numbered clauses.

1. A cycle seat comprising: a crotch area which is arranged between a user's legs in use; a seat section which is arranged to support the user's backside in use; and at least one rear support portion which extends vertically and restricts rearwards movement of the user with respect to the seat section.
2. A cycle seat according to clause 1 wherein the at least one rear support portion is permanently integrated to the seat section at an anchor.
3. A device according to clause 2 wherein the at least one rear support portion and seat section are formed from a single body.
4. A cycle seat according to clause 3 wherein the at least one rear portion comprises two extending portions to either side of the coccyx in use.
5. A cycle seat according to clause 3 wherein the at least one rear support portion comprises on extending portion in line with the coccyx in use.
6. A cycle seat according to clause 2 wherein the at least one rear support portion is bonded to the seat section at the anchor.
7. A cycle seat according to any preceding clause wherein the at least one rear support portion is displaceable with respect to the seat section.
8. A cycle seat according to any preceding clause wherein the at least one rear support portion is resiliently deformable.
9. A cycle seat according to any preceding clause wherein the at least one rear support portion is permanently bonded to the seat section or crotch area at an anchor that extends along only part of the support portion, so as to leave part of the portion unsupported.
10. A cycle seat according to clause 6 wherein the anchor comprises a hinge.
11. A cycle seat according to any of the preceding clauses wherein at least part of the at least one rear support portion is displaceable into an opening in the seat section.
12. A bicycle incorporating a cycle seat according to any of the preceding clauses.

The invention claimed is:
1. A cycle seat comprising:
a seat section defining a support surface having a forward extension for a user to straddle and a rearward platform for supporting a user's backside;
a rear support portion including:
a proximal portion that extends substantially contiguously with the support surface in line with the forward extension; and
a distal portion that extends upwardly from a central portion of the rearward platform between two portions of the seat section away from the proximal portion, the distal portion configured to engage the coccyx of a user and to thereby restrict rearward motion of a user when sat on the support surface, wherein the rear support portion has a maximum width that is less than a maximum width of the rearward platform.

2. The cycle seat of claim 1, wherein the rear support portion has a curved midsection joining the distal portion to the proximal portion.

3. The cycle seat of claim 2, wherein the curved midsection has a minimum radius of curvature of at least 10 mm.

4. The cycle seat of claim 1, wherein the width of the rear support portion is no more than 40 mm.

5. The cycle seat of claim 1, wherein a tip of the distal portion is offset in a direction perpendicular to a tangent to a tip of the proximal portion by a distance of no more than 150 mm.

6. The cycle seat of claim 1, wherein an end of the distal portion extends relative to an end of the proximal portion at an angle falling in the range 90 to 120 degrees.

7. A cycle seat according to claim 1, wherein the at least one rear support portion is permanently integrated to the seat section at an anchor.

8. A device according to claim 7 wherein the at least one rear support portion and seat section are formed from a single body.

9. A cycle seat according to claim 8 wherein the at least one rear portion comprises two extending portions to either side of the coccyx in use.

10. A cycle seat according to claim 8 wherein the at least one rear support portion comprises an extending portion in line with the coccyx in use.

11. A cycle seat according to claim 7 wherein the at least one rear support portion is bonded to the seat section at the anchor.

12. A cycle seat according to claim 11 wherein the anchor comprises a hinge.

13. A cycle seat according to claim 1, wherein the at least one rear support portion is displaceable with respect to the seat section.

14. A cycle seat according to claim 1, wherein the at least one rear support portion is resiliently deformable.

15. A cycle seat according to claim 1, wherein the at least one rear support portion is permanently bonded to the seat section or the crotch area at an anchor that extends along only part of the rear support portion, so as to leave part of the rear portion unsupported.

16. A cycle seat according to claim 1, wherein at least part of the at least one rear support portion is displaceable into an opening in the seat section.

17. A bicycle, comprising:
a cycle seat, the cycle seat comprising:
  a seat section defining a support surface having a forward extension for a user to straddle and a rearward platform for supporting a user's backside;
  a rear support portion including:
    a proximal portion that extends substantially contiguously with the support surface in line with the forward extension; and
    a distal portion that extends upwardly from a central portion of the rearward platform between two portions of the seat section away from the proximal portion, the distal portion configured to engage the coccyx of a user and to thereby restrict rearward motion of a user when sat on the support surface,
  wherein the maximum width of the rear support portion is less than a maximum width of the rearward platform.

* * * * *